(12) United States Patent
Endo et al.

(10) Patent No.: US 11,034,815 B2
(45) Date of Patent: Jun. 15, 2021

(54) SPONGE-FORMING LIQUID SILICONE RUBBER COMPOSITION AND SILICONE RUBBER SPONGE

(71) Applicant: DOW TORAY CO., LTD., Tokyo (JP)

(72) Inventors: Shuji Endo, Ichihara (JP); Takatoshi Toyama, Ichihara (JP); Tsugio Nozoe, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 79 days.

(21) Appl. No.: 16/464,455

(22) PCT Filed: Nov. 21, 2017

(86) PCT No.: PCT/JP2017/041795
§ 371 (c)(1),
(2) Date: May 28, 2019

(87) PCT Pub. No.: WO2018/097125
PCT Pub. Date: May 31, 2018

(65) Prior Publication Data
US 2019/0375908 A1 Dec. 12, 2019

(30) Foreign Application Priority Data
Nov. 28, 2016 (JP) .............................. JP2016-229740

(51) Int. Cl.
C08J 9/28 (2006.01)
C08J 9/00 (2006.01)
C08L 83/04 (2006.01)

(52) U.S. Cl.
CPC ............ *C08J 9/286* (2013.01); *C08J 9/0042* (2013.01); *C08J 9/0061* (2013.01); *C08J 9/0066* (2013.01); *C08L 83/04* (2013.01); *C08J 2201/028* (2013.01); *C08J 2201/0504* (2013.01); *C08J 2205/044* (2013.01); *C08J 2205/05* (2013.01); *C08J 2383/07* (2013.01); *C08J 2483/07* (2013.01); *C08L 2201/52* (2013.01); *C08L 2203/14* (2013.01); *C08L 2312/00* (2013.01)

(58) Field of Classification Search
CPC ... C08J 2205/044; C08J 2205/05; C08L 83/04
See application file for complete search history.

(56) References Cited
U.S. PATENT DOCUMENTS

| 7,687,563 | B2 | 3/2010 | Shirasaki et al. | |
|---|---|---|---|---|
| 9,051,445 | B2 | 6/2015 | Nozoe et al. | |
| 2010/0003484 | A1* | 1/2010 | Blanc | C08L 83/04 428/219 |
| 2010/0022660 | A1* | 1/2010 | Wegner | A01N 25/16 514/724 |
| 2011/0021649 | A1 | 1/2011 | Sakuma et al. | |
| 2011/0190410 | A1* | 8/2011 | Nozoe | C08G 77/20 521/122 |
| 2011/0319510 | A1 | 12/2011 | Tsuchiyama et al. | |
| 2015/0259495 | A1* | 9/2015 | Liu | C08G 77/70 521/82 |
| 2018/0194916 | A1* | 7/2018 | Yamaoka | C08J 9/28 |
| 2019/0001618 | A1* | 1/2019 | Doi | C08J 9/0061 |

FOREIGN PATENT DOCUMENTS

| JP | 2003096223 A | 4/2003 |
|---|---|---|
| JP | 2004346248 A | 12/2004 |
| JP | 2008214625 A | 9/2008 |
| JP | 2010150350 A | 7/2010 |
| JP | 2011168728 A | 9/2011 |
| JP | WO2017110565 A1 | 10/2018 |
| WO | 2010013847 A1 | 2/2010 |
| WO | WO 2017/094703 * | 6/2017 |
| WO | WO 2017/110681 A1 * | 6/2017 |

OTHER PUBLICATIONS

Product data sheet for Shin Etsu product KF-6015 (no date).*
English translation of International Search Report for PCT/JP2017/041795 dated May 31, 2018, 2 pages.
Machine assisted English translation of JP2003096223A obtained from https://patents.google.com on Aug. 26, 2019, 12 pages.
Machine assisted English translation of JP2011168728A obtained from https://patents.google.com on Aug. 26, 2019, 12 pages.
Machine assisted English translation of JPWO2017110565 A1 obtained from https://worldwide.espacenet.com on Aug. 27, 2019, 21 pages.

* cited by examiner

*Primary Examiner* — Marc S Zimmer
(74) *Attorney, Agent, or Firm* — Warner Norcross + Judd LLP

(57) ABSTRACT

A sponge-forming liquid silicone rubber composition is provided. The composition generally maintains a stable emulsified state, can form a low-density silicone rubber sponge having a uniform and fine open-cell foam structure even when a coating or molding method involving shearing force and thin layer formation is used, is less likely to contract during curing, and that forms a silicone rubber sponge having a density close to the density designed on the basis of water content. A low-density silicone rubber sponge material using the sponge-forming liquid silicone rubber composition is also provided. The sponge-forming liquid silicone rubber composition comprises (A) an alkenyl group-containing organopolysiloxane, (B) an organopolysiloxane having a silicon atom-bonded hydrogen atom, (C) a mixture of water and an inorganic thickener, (D) an emulsifier, and (E) a hydrosilylation reaction catalyst. The contained amount of the component (C) in the entire composition is 70 mass % or more.

18 Claims, No Drawings

SPONGE-FORMING LIQUID SILICONE RUBBER COMPOSITION AND SILICONE RUBBER SPONGE

CROSS-REFERENCE TO RELATED APPLICATIONS

This application is the National Stage of International Application No. PCT/JP2017/041795 filed on 21 Nov. 2017, which claims priority to and all advantages of Japanese Patent Application No. 2016-229740 filed on 28 Nov. 2016, the contents of which are hereby incorporated by reference.

TECHNICAL FIELD

The present invention relates to a sponge-forming liquid silicone rubber composition and to a silicone rubber sponge obtained by cross-linking this composition and then removing the water. The present invention also relates to a method for producing a sponge-forming liquid silicone rubber composition.

BACKGROUND ART

Because silicone rubber sponges are lightweight and have excellent heat resistance and weather resistance, they are used in automotive parts, rolls and belts for image forming devices such as copying machines and printers, and various types of sealing parts.

Known silicone rubber compositions used to form these silicone rubber sponges include sponge-forming liquid silicone rubber compositions comprising a diorganopolysiloxane having at least two silicon atom-bonded alkenyl groups per molecule, an organopolysiloxane having at least two silicon atom-bonded hydrogen atoms per molecule, water containing smectite clay, a nonionic surfactant, and a hydrosilylation reaction catalyst (see Patent Document 1), and sponge-forming liquid silicone rubber compositions comprising a diorganopolysiloxane blocked at both molecular chain ends with an alkenyl group and having no alkenyl groups in the molecular side chain, a diorganopolysiloxane having at least two alkenyl groups in the molecular side chain, an organopolysiloxane having at least two silicon atom-bonded hydrogen atoms per molecule, a mixture of water and smectite clay, a nonionic surfactant, a hydrosilylation reaction catalyst, and a curing retarder (see Patent Document 2).

However, when the amount of water is increased to form a low-density sponge with such a sponge-forming liquid silicone rubber composition, it is difficult to uniformly disperse the silicone rubber composition in the water. It is also difficult to form a uniformly fine open-cell structure in the resulting silicone rubber sponge.

In order to solve these problems, the present applicant has proposed using a combination of two nonionic surfactants with different HLBs in the sponge-forming liquid silicone rubber composition (Patent Document 3). These compositions are technically useful in increasing the amount of water used to form low density sponges, but there is still room to improve the emulsion stability of the composition itself and to increase the amount of water used.

PRIOR ART DOCUMENTS

Patent Documents

Patent Document 1: JP 2004-346248 A
Patent Document 2: JP 2008-214625 A
Patent Document 3: JP 2015-252782 (Filed but not yet disclosed)

SUMMARY OF THE INVENTION

Problem to be Solved by the Invention

The present inventors have discovered new problems related to diversification of sponge applications and low-density sponge formation. In order to increase the types of applications for silicone rubber sponge, methods for applying and curing sponge-forming liquid silicone rubber compositions other than conventional molding will be required. As a result, compositions with the emulsion stability to withstand the shearing force of a coater in coating methods and sheet-forming methods will be required, and the formation of low-density silicone rubber sponges with a uniformly fine open-cell structure will be required. These demands cannot be met by known compositions.

In addition, the design density of silicone rubber sponges obtained using these sponge-forming liquid silicone rubber compositions is essentially the density of silicone rubber sponges obtained by crosslinking the compositions and then removing the water, which can be designed from crosslinking volume and water content. Because sponge-forming liquid silicone rubber compositions with a high water content are generally unstable in the emulsified state, a uniformly fine open-cell structure is not formed before or during the crosslinking reaction, and the distortion or coarseness of the cell structure when the water is removed sometimes causes the cell structure to collapse or become deformed, shrinkage of the cured volume, and formation of a sponge that does not have the design density. Therefore, when a silicone rubber sponge with an especially low density is to be obtained, the shape and density cannot be obtained as designed in the molding and sheet forming process, and it can be difficult to set optimum conditions during the curing process.

Furthermore, known sponge-forming liquid silicone rubber compositions have an insufficient pot life, especially compositions with a high water content that are uniformly applied in a thin layer. Therefore, there is room for improvement in terms of handling and workability.

The present invention has been devised to solve these problems. Specifically, it is an object of the present invention to provide a sponge-forming liquid silicone rubber composition which, because it has a high water content and stable emulsification state, can form a low-density silicone rubber sponge with a uniformly fine open-cell structure even when a coating or molding method involving shear force or thinning is used, and can form a silicone rubber sponge that is less likely to shrink during curing and has a density close to the density designed based on water content. Another object of the present invention is to provide a low-density silicone rubber sponge having a uniformly fine open-cell structure. Yet another object of the present invention is to provide such a sponge-forming liquid silicone rubber composition with excellent handling and workability.

Means for Solving the Problem

The present invention is a hydrosilylation reaction-curable sponge-forming liquid silicone rubber composition comprising components (A) to (F) below, the content of component (C) being 70% by mass or more relative to the entire composition.

(A) 100 parts by mass alkenyl group-containing organopolysiloxane,
(B) organopolysiloxane having at least two silicon atom-bonded hydrogen atoms per molecule (in an amount such that the number of moles of hydrogen atoms bonded to silicon atoms in component (B) is 0.4 to 20 per mole of alkenyl groups in component (A)),
(C) 250 to 850 parts by mass mixture of water and inorganic thickener,
(D) 0.1 to 15 parts by mass emulsifier,
(E) hydrosilylation catalyst (in an amount sufficient to crosslink the composition), and
(F) 0.001 to 5 parts by mass curing retarder.

Because a composition of the present invention has a high water content, the density of a silicone rubber sponge obtained by crosslinking the sponge-forming liquid silicone rubber composition and then removing water from the silicone rubber is preferably 0.45 g/cm$^3$ or less or 0.40 g/cm$^3$ or less. The density of a silicone rubber sponge is more preferably 0.35 g/cm$^3$ or less, 0.30 g/cm$^3$ or less, or 0.25 g/cm$^3$ or less.

In a composition of the present invention, preferably at least a portion of component (D) is a silicone surfactant having an HLB value of less than 6. A preferred example is a silicone-based surfactant comprising a polyether-modified silicone having an HLB value in a range from 3 to 5.

Preferably, component (D) comprises
(D-1) a non-silicone nonionic surfactant having an HLB value of 3 or more,
(D-2) a non-silicone nonionic surfactant having an HLB value of less than 3 {provided the mass ratio of component (D-1) to component (D-2) is at least 1}, and
(D-3) a silicone surfactant having an HLB value of less than 6.

From the standpoint of further improving the emulsion stability of a composition of the present invention, component (A) is an organopolysiloxane mixture of a linear or branched organopolysiloxane and a resin-like organopolysiloxane at a ratio of 100:0 to 75:25. The linear or branched organopolysiloxane is preferably an organopolysiloxane comprising (A-1) a diorganopolysiloxane having an average of two alkenyl groups at the molecular chain end and no alkenyl groups in a molecular side chain and (A-2) a diorganopolysiloxane having at least two alkenyl groups in a molecular side chain.

From the standpoint of improving the handling and workability of a composition of the present invention, component (E) is preferably a catalyst obtained by dispersing or encapsulating and then micronizing a hydrosilylation reaction catalyst in a thermoplastic resin.

The inorganic thickener in component (C) is preferably smectite.

Preferably, a composition of the present invention further comprises at least 20 parts by mass silica fine powder (G) per 100 parts by mass component (A).

The present invention is also a silicone rubber sponge obtained by crosslinking a sponge-forming liquid silicone rubber composition described above and then removing water from the silicone rubber.

Preferably, the silicone rubber sponge has an average cell diameter of 1 μm or more and less than 50 μm, and an open cell ratio of 90% or more.

A composition of the present invention is preferably obtained by mixing together and mechanically pulverizing mixture A containing a portion of component (A), component (B) and component (F), mixture B containing the remaining portion of component (A) and component (E), and mixture C containing component (C). From the standpoint of improving emulsion stability, the production method preferably includes any of the following steps:
a step of mixing component (D) into mixture A,
a step of mixing a non-silicone emulsifier in component (D) with mixture A,
a step of mixing a silicone emulsifier in component (D) with mixture C,
a step of mixing component (D) with mixture C,
a step of mixing a portion of component (D) with mixture A;
a step of mixing the remaining portion of component (D) with mixture C,
a step of mixing a silicone emulsifier in component (D) with mixture A; and a step of mixing a non-silicone emulsifier in component (D) with mixture C.

Effects of the Invention

The present invention is able to provide a sponge-forming liquid silicone rubber composition which, because it has a high water content and stable emulsification state, can form a low-density silicone rubber sponge with a uniformly fine open-cell structure even when a coating or molding method involving shear force or thinning is used, and can form a silicone rubber sponge that is less likely to shrink during curing and has a density close to the density designed based on water content. The present invention is also able to provide a low-density silicone rubber sponge having a uniformly open-cell structure. The present invention is also able to provide a sponge-forming liquid silicone rubber composition with these technical effects that also has excellent handling and workability.

EMBODIMENT OF THE INVENTION

Component (A) is the main component in the composition and is an organopolysiloxane having at least two alkenyl groups per molecule. Examples of alkenyl groups in component (A) include alkenyl groups having from 2 to 12 carbon atoms such as a vinyl group, allyl groups, and hexenyl group. A vinyl group is preferred. Examples of silicon atom-bonded organic groups other than alkenyl groups in component (A) include alkyl groups having from 1 to 12 carbon atoms such as a methyl group, ethyl group, propyl group, butyl group, pentyl group, hexyl group, heptyl group, octyl group, nonyl group, decyl group, undecyl group, and dodecyl group; aryl groups having from 6 to 12 carbon atoms such as a phenyl group, tolyl group, xylyl group, and naphthyl group; aralkyl groups having from 7 to 12 carbon atoms such as a benzyl group and phenethyl group; and halogen-substituted alkyl groups such as a 3-chloropropyl group and 3,3,3-trifluoropropyl group. A methyl group is preferred.

There are no particular restrictions on the molecular structure of component (A), which may be linear, partially branched linear, branched, cyclic, or dendritic. Linear or partially branched linear is preferred. Component (A) may be a mixture of two or more of these molecular structures.

From the standpoint of emulsion stability, component (A) is an organopolysiloxane mixture of a linear or branched organopolysiloxane and a resin-like organopolysiloxane at a ratio of 100:0 to 75:25.

More specifically, component (A) is an organopolysiloxane mixture of components (A-L) and (A-R) below at a mass ratio of 100:0 to 75:25, and preferably at a mass ratio of 100:0 to 85:15.

(A-L): a linear or branched organopolysiloxane having at least two alkenyl groups per molecule, and (A-R): a resin-like organopolysiloxane containing a $SiO_{4/2}$ unit or $RSiO_{3/2}$ (where R is a monovalent hydrocarbon group, alkoxy group, or hydroxyl group) having at least two alkenyl groups per molecule Component (A-L) is a linear or branched organopolysiloxane, but a substantially linear organopolysiloxane is preferred. Preferably, component (A-L) is a mixture of (A-1) a diorganopolysiloxane having an average of two alkenyl groups at the molecular chain end and no alkenyl groups in a molecular side chain and (A-2) a diorganopolysiloxane having at least two alkenyl groups in a molecular side chain.

Component (A-1) is a diorganopolysiloxane having an average of two alkenyl groups at the molecular chain end and no alkenyl groups in a molecular side chain. Specific examples include dimethylvinylsiloxy-terminated dimethylpolysiloxanes, dimethylvinylsiloxy-terminated dimethylsiloxane/methylphenylsiloxane copolymers, and branched dimethylpolysiloxanes whose main chain consists of repeating dimethylsiloxane units, whose main chain is partially branched, and whose molecular chain ends are blocked with dimethylvinylsiloxy groups. Diorganopolysiloxanes whose main chain is substantially linear are preferred. There are no restrictions on the viscosity at 25° C. of component (A-1), but a range from 0.05 to 1000 Pa·s is preferred.

Component (A-2) is a diorganopolysiloxane having at least two alkenyl groups in a molecular side chain. Specific examples include trimethylsiloxy-terminated methyl vinylpolysiloxanes, trimethylsiloxy-terminated dimethylsiloxane/methylvinylsiloxane copolymers, trimethylsiloxy-terminated dimethylsiloxane/methylvinylsiloxane/methylphenylsiloxane copolymers, and branched dimethylsiloxane/methylvinylsiloxane copolymers whose main chain consists of repeating dimethyl siloxane units and methyl vinyl siloxane units, whose main chain is partially branched, and whose molecular chain ends are blocked with dimethysiloxy groups. Diorganopolysiloxanes whose main chain is substantially linear are preferred. There are no restrictions on the viscosity at 25° C. of component (A-2), but a range from 0.05 to 1000 Pa·s is preferred.

There are no particular restrictions on the blending ratio of component (A-1) and component (A-2). However, in order to improve the shrinkage rate of the resulting silicone rubber sponge, component (A) is preferably composed of from 10 to 90% by mass component (A-1) and from 10 to 90% by mass component (A-2).

Component (A-R) is a resin-like organopolysiloxane containing a $SiO_{4/2}$ unit or $RSiO_{3/2}$ (where R is a monovalent hydrocarbon group or hydroxyl group) having at least two alkenyl groups per molecule. When combined with component (A-L), they may contribute to further improvement to the emulsion stability of the present composition, and to a higher water content and lower density and shrinkage rate of the resulting silicone rubber sponge. Component (A-R) is a resin-like organopolysiloxane containing at least one of a Q unit represented by $SiO_{4/2}$ and a T unit represented by $RSiO_{3/2}$, optionally containing an M unit represented by $R^3SiO_{1/2}$ and a D unit represented by $R^2SiO_{1/2}$, and having at least two alkenyl groups per molecule. Preferred combinations of these units include MQ resins, MDT resins, MDQ resins, and T resins.

From the standpoint of improving emulsion stability, Component (A-R) is preferably a resin-like organopolysiloxane substantially comprising an M unit represented by $R^3SiO_{1/2}$ and a Q unit represented by $SiO_{4/2}$, having a molar ratio of M units to Q units in a range from 0.5 to 2.0, and having a vinyl group ($CH_2$=$CH$—) content among the alkenyl groups in a range from 0.1 to 5.0% by mass. Preferably, R is a hydroxyl group, an alkoxy group having from 1 to 6 carbon atoms, or a monovalent hydrocarbon group having from 1 to 10 carbon atoms and optionally a halogen atom. More preferably, R is a group selected from a methyl group, an alkenyl group having from 2 to 8 carbon atoms, and a hydroxyl group, and having a vinyl group ($CH_2$=$CH$—) moiety content among all alkenyl groups in component (A-R) in a range from 0.1 to 2.0% by mass.

Component (B) is the crosslinking agent in the present composition, and is an organopolysiloxane having at least two silicon atom-bonded hydrogen atoms per molecule. There are no particular restrictions on the bonding position of the silicon atom-bonded hydrogen atom in component (B), which can be at a molecular chain end and/or in a molecular side chain. Examples of silicon atom-bonded organic groups in component (B) include alkyl groups having from 1 to 12 carbon atoms such as a methyl group, ethyl group, propyl group, butyl group, pentyl group, hexyl group, heptyl group, octyl group, nonyl group, decyl group, undecyl group, and dodecyl group; aryl groups having from 6 to 12 carbon atoms such as a phenyl group, tolyl group, xylyl group, and naphthyl group; aralkyl groups having from 7 to 12 carbon atoms such as a benzyl group and phenethyl group; and halogen-substituted alkyl groups such as a 3-chloropropyl group and 3,3,3-trifluoropropyl group. A methyl group is preferred.

Examples of component (B) include dimethylhydrogensiloxy-terminated dimethylpolysiloxanes, dimethylhydrogensiloxy-terminated dimethylsiloxane/methylhydrogensiloxane copolymers, trimethylsiloxy-terminated methyl hydrogen polysiloxanes, trimethylsiloxy-terminated dimethylsiloxane/methylhydrogensiloxane copolymers, and organopolysiloxanes comprising a siloxane unit represented by $(CH_3)_3SiO_{1/2}$, a siloxane unit represented by $H(CH_3)_2SiO_{1/2}$, and a siloxane unit represented by $SiO_{4/2}$. Linear organopolysiloxanes are preferred.

The amount of component (B) in terms of the amount of silicon-atom bonded hydrogen atoms in the component per mole of alkenyl groups in component (A) is in a range from 0.4 to 20 mol and preferably in a range from 1.5 to 20 mol or from 1.5 to 10 mol. When the number of moles of silicon atom-bonded hydrogen atoms in component (B) is within these ranges, the compression set of the resulting silicone rubber sponge is improved.

Component (C) is a mixture of water and an inorganic thickener. A silicone rubber sponge is obtained by crosslinking the present composition and then removing the water in component (C) from resulting silicone rubber. The water in component (C) is preferably deionized water because it stably disperses component (C) in component (A).

The inorganic thickener in the component (C) is blended in to increase the viscosity of water, to more easily disperse component (C) in component (A), and to stabilize component (C) in a dispersed state. The inorganic thickener may be natural or organic. Examples include natural or synthetic smectite clays such as bentonite, montmorillonite, hectorite, saponite, sauconite, beidellite and nontronite; magnesium aluminum silicate; and composites of these with water-soluble organic polymers such as carboxyvinyl polymers. Smectite clays such as bentonite and montmorillonite are preferred. Commercially available smectite clays include Smecton SA (from Kunimine Industrial), which is a hydrothermally synthesized product, and Bengel (from Hojun). which is a purified natural product. From the standpoint of maintaining the heat resistance of the resulting silicone rubber sponge, the pH of these smectite clays is preferably in a range from pH 5.0 to 9.0. The amount of inorganic thickener in component (C) is preferably in a range from 0.1 to 10 parts by mass or in a range from 0.5 to 5 parts by mass per 100 parts by mass water.

The composition is a high water content composition, and the content of component (C) relative to the entire composition is 70% by mass or more, and preferably 75% by mass or more or 80% by mass or more. Because the water content of the composition is within this range, shrinkage is suppressed. Therefore, the density of a silicone rubber sponge obtained by crosslinking the sponge-forming liquid silicone rubber composition and then removing water from the silicone rubber can be 0.45 g/cm$^3$ or less or 0.40 g/cm$^3$ or less.

The amount of component (C) per 100 parts by mass component (A) is in a range from 250 to 850 parts by mass, and preferably in a range from 250 to 800 parts by mass, in a range from 250 to 600 parts by mass, and in a range from 250 to 550 parts by mass. When the amount of component (C) is at or above the lower limit of these ranges, a low-density silicone rubber sponge can be formed. When the amount is at or below the upper limit of these ranges, a sponge having a uniformly fine open-cell structure can be formed.

The density of a silicone rubber sponge obtained by crosslinking the composition and then removing water from the silicone rubber is preferably 0.45 g/cm$^3$ or less or 0.40 g/cm$^3$ or less, and more preferably 0.35 g/cm$^3$ or less, 0.30 g/cm$^3$ or less, or 0.25 g/cm$^3$ or less. Because the composition has excellent emulsion stability and exhibits curing behavior close to the design density, composition design is easy even when a low-density silicone rubber sponge with a density of 0.40 g/cm$^3$ or less is attempted, which was difficult in the prior art.

Although composition is a high water content composition, it has excellent emulsion stability. The overall appearance of the composition is uniform even when the amount of component (C) in the entire composition is 70 mass % or more. The viscosity at 25° C. of the hydrosilylation-curable sponge-forming silicone rubber composition measured with a rheometer (Advanced Rheometer AR500 from TA Instruments) using a 2° cone plate with a 2 cm radius at a shear rate of 10 s$^{-1}$ is from 1 to 100 Pa·s and preferably from 5 to 60 Pa·s. Also, the viscosity at 25° C. at a shear rate of 10 s$^{-1}$ is in a range from 1.5 times to 6.0 times, and preferably in a range from 2.0 times to 5.0 times, the viscosity at 25° C. at a shear rate of 100 s$^{-1}$. This indicates a stable emulsion state relative to the shear force despite being a high water content composition. The emulsion does not break down even when applied thinly, and a uniformly fine open-cell structure is formed during the curing process.

Component (D) is an emulsifier included to more finely disperse water in the hydrosilylation reaction-curable sponge-forming liquid silicone rubber composition and stabilize the dispersion state. Any well-known emulsion can be used, which can be anionic, cationic, zwitterionic, or nonionic. Specific examples include nonionic surfactants such as glycerin fatty acid esters, polyglycerin fatty acid esters, sorbitan fatty acid esters, sucrose fatty acid esters, polyethylene glycol fatty acid esters, polypropylene glycol fatty acid esters, polyoxyethylene glycerin fatty acid esters, polyoxyethylene sorbitan fatty acid esters, polyoxyethylene/polyoxypropylene block copolymers, polyoxyethylene alkyl ethers, polyoxyethylene alkylphenyl ethers, and polyoxyethylene fatty acid amides; nonionic surfactants comprising an organopolysiloxane such as polysiloxane/polyoxyethylene graft copolymer; cationic surfactants such as aliphatic amine salts, quaternary ammonium salts, and alkyl pyridinium salts; anionic surfactants such as higher fatty acid salts, higher alcohol sulfates, alkyl benzene sulfonates, alkyl naphthalene sulfonates, and polyethylene glycol sulfates; and carboxybetaine- or glycine-type zwitterionic surfactants. Among these, nonionic surfactants are preferred because they have less influence on the hydrosilylation reaction.

These emulsifiers may be used alone or in combinations of two or more. The HLB value of the emulsifier (or the weight-average HLB value when a combination of two or more emulsifiers is used) is preferably 1 or higher and 10 or lower, more preferably 1.5 or higher and less than 6, and even more preferably 3.5 or higher and less than 6. There are no particular restrictions on the amount of emulsifier used and this can be adjusted. However, in general, an amount in a range from 0.02 to 15% by mass of the hydrosilylation reaction-curable sponge-forming liquid silicone rubber composition is preferred.

Some or all of component (D) in the present invention is preferably a silicone surfactant with an HLB value of less than 6. When at least some of component (D) is a silicone surfactant, emulsion stability of the high water content composition is further improved, and a reduction in the density of the silicone rubber sponge obtained by crosslinking the composition and removing water can be realized.

There are no particular restrictions on the type and structure of the silicone surfactants. Examples include polysiloxane compounds having a hydrophilic group such as a polyoxyalkylene (polyether) modified group, a polyglycerin modified group, a glycerin modified group or a sugar alcohol modified group in the molecule, and polysiloxane/polyoxyalkylene block copolymers having a polysiloxane block and a polyoxyalkylene block. These silicone surfactants may also have a functional group such as a long chain alkyl group, a siloxane macromonomer structure, or a carbosiloxane dendrimer structure in the molecule. They may also be silicone surfactants in which a portion of the polysiloxane chain is crosslinked with another polysiloxane chain, a polyoxyalkylene structure or a silalkylene structure, or microcrosslinkable silicone surfactants that are liquid at room temperature due to a low crosslinking density.

A preferred silicon surfactant has an HLB of less than 6, preferably in an HLB range from 2.0 to 5.5 or from 3.0 to 5.0. One type or a mixture of two or more types of these silicone surfactants may be used. Examples include silicone surfactants represented by the general formula: $R^A{}_a R\text{-}B{}_b Q_c L_d SiO_{(4-a-b-c-d)/2}$ {In this formula, $R^A$ is a monovalent organic group (excluding $R^B$, L and Q), a hydrogen atom, or a hydroxyl group, $R^B$ is a substituted or unsubstituted linear or branched monovalent hydrocarbon group having from 9 to 60 carbon atoms or a linear or branched organosiloxane group bonded to a silicon atom via a divalent organic group, L is a silylalkyl group having a carbosiloxane dendrimer structure bonded to a silicon atom via a divalent organic group, and Q is a monovalent hydrophilic group. Each of a, b, c and d is a number in the ranges $1.0 \leq a \leq 2.5$, $0 \leq b \leq 1.5$, $0.001 \leq c \leq 1.5$, and $0 \leq d \leq 1.5$, and c is a number such that the HLB value of the entire molecule is less than 6.}. Here, examples of hydrophilic groups Q are the same as those mentioned above. Preferred examples include a polyglycerin modified group, a glycerin modified group, and a polyoxyalkylene (polyether) modified group in which a hydroxyl group or a methoxy group is on the end. $R^A$ is preferably a methyl group, a phenyl group, or a hydroxyl group. $R^B$ and L can be any functional group. However, the emulsion stability can sometimes be improved when $R^B$ is a long-chain alkyl group having from 8 to 20 carbon atoms and L is a silylalkyl group having a carbosiloxane dendrimer structure.

More preferably, some or all of component (D) in the composition is a silicone surfactant having an HLB value of less than 6 represented by the following structural formula:

[Formula 1]

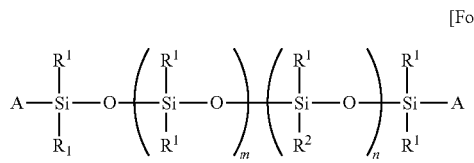

{In this formula, $R^1$ is a monovalent hydrocarbon group, hydroxyl group or alkoxy group, $R^2$ is a group selected from a polyoxyalkylene group represented by $—R^3—O—(C_2H_4O)_d(C_3H_6O)_eR^4$ [where $R^3$ is an alkylene group having from 2 to 30 carbon atoms and $R^4$ is a hydrogen atom or an alkyl group having from 1 to 30 carbon atoms) or an inorganic group represented by $R^5—(CO)—$ (where $R^5$ is an alkyl group having from 1 to 30 carbon atoms), and each of d and e is an integer in the ranges of $0 \leq c \leq 50$ and $0 \leq d \leq 50$, respectively, provided $1 \leq d+e$], and each A is independently a group selected from $R^1$ and $R^2$. m is a number in a range from 1 to 500, and n is a number in a range from 0 to 100, provided at least one A is $R^2$ when n is 0.}.

More preferably, some of component (D) is a silicone surfactant having an HLB value of 3.0 to 5.0 represented by the aforementioned structural formula, where $R^1$ is a group selected from an alkyl group or halogenated alkyl group having from 1 to 6 carbon atoms, a phenyl group and a hydroxyl group, A is $R^1$, m is a number in the range from 5 to 100, and n is a number in the range from 1 to 5. There are no particular restrictions on the value for d+e, but the value is preferably a number in a range from 5 to 20 and more preferably a value in a range from 7 to 15 from the standpoint of improving emulsion stability. A preferred example is a silicone surfactant in which e is 0, d is in a range from 5 to 15, and substituent $R^2$ is a polyoxyethylene modified group in a side chain. The viscosity of the silicone surfactant is preferably from 50 to 10,000 mPa·s and more preferably from 100 to 5,000 mPa·s.

Component (D) may optionally be a silicone surfactant that has been subjected to low bromination treatment by hydrogenation or acid treatment. The ends of the hydrophilic functional groups may consist substantially of hydroxyl groups due to the low bromination treatment.

In the composition, the surfactant in component (D) is more preferably a mixture of non-silicone nonionic surfactant and silicone surfactant, and even more preferably contains (D-1) to (D-3) below. Note that a non-silicone nonionic surfactant is a nonionic surfactant which does not have a siloxane structure in the molecule which makes it distinct from a silicone surfactant.

(D-1) is a non-silicone nonionic surfactant having an HLB value of 3 or more,
(D-2) is a non-silicone nonionic surfactant having an HLB value of less than 3, and
(D-3) is a silicone surfactant having an HLB value of less than 6.

Component (D) has a mass ratio of component (D-1) to component (D-2) of at least 1, and preferably at least 5, at least 8, at least 10, or at least 15. Also, the mass ratio of component (D-1) to component (D-2) is preferably at most 100, and more preferably at most 80, at most 70, at most 60, or at most 50. If the mass ratio is at or above the lower limit, a low-density sponge with a uniformly fine open-cell structure can be formed. If the mass ratio is at or below the upper limit, component (C) can be uniformly dispersed in component (A) and a sponge can be formed having a uniformly fine open-cell structure. When a composition includes a silicone surfactant in (D-3) in addition to component (D-1) and component (D-2), emulsion stability is improved and an oil-in-water emulsion composition that is stable with respect to shear force is formed even with a high water content. When the water is removed after crosslinking, a low-density sponge having a uniformly fine open-cell structure can be formed. A silicone sponge can also be stably formed in accordance with the density design that exhibits curing behavior according to a low-density sponge design based on the water content, and that is less likely to experience a reduction in volume or deviate from the design density during sponge formation due to shrinkage or emulsion breakdown.

The amount component (D) is in a range from 0.1 to 15 parts by mass, and preferably from 0.2 to 13 parts by mass, with respect to 100 parts by mass component (A). When the amount of component (D) is at or above the lower limit of this range, a sponge with a uniformly fine open-cell structure can be formed. When the amount is at or below the upper limit of this range, a silicone sponge with excellent heat resistance can be formed.

Component (E) is a hydrosilylation reaction catalyst for promoting the hydrosilylation reaction of the present composition. Examples include platinum-based catalysts, palladium-based catalysts, and rhodium-based catalysts. Platinum-based catalysts are preferred. Specific examples of component (E) include chloroplatinic acid; alcohol-modified chloroplatinic acid; coordination compounds of chloroplatinic acid and olefins, vinylsiloxanes or acetylene compounds; coordination compounds of platinum and olefins, vinylsiloxanes or acetylene compounds; and others such as tetrakis (triphenylphosphine) palladium and chlorotris (triphenylphosphine) rhodium.

From the standpoint of improving handling and workability of the composition, the hydrosilylation reaction catalyst may be and preferably is a microparticulate catalyst obtained by dispersing or encapsulating and then micronizing a hydrosilylation reaction catalyst in a thermoplastic resin, such as a silicone resin, polycarbonate resin, or acrylic resin. By micronizing a hydrosilylation reaction catalyst in a thermoplastic resin, the pot life of the composition can be extended without excessive use of cure retarders which can inhibit curing, and a good crosslinking reaction can be realized. Because hydrosilylation reaction-curable sponge-forming liquid silicone rubber compositions have been applied in sheet form and uses extending beyond conventional molding methods have increased in recent years, this can improve handling and workability, especially pot life, without inhibiting curing. Preparation methods for these microparticulate hydrosilylation reaction catalysts are known, and have been disclosed, for example, in JP H07-118535 A.

In the present invention, a platinum-alkenyl siloxane complex is preferred and a microparticulate catalyst hydrosilylation reaction catalyst dispersed or encapsulated and then micronized is especially preferred. Examples of alkenyl siloxanes include 1,3-divinyl-1,1,3,3-tetramethyldisiloxane, 1,3,5,7-tetramethyl-1,3,5,7-tetravinylcyclotetrasiloxane, alkenyl siloxanes in which some of the methyl groups in these alkenyl siloxanes have been substituted with, for example, an ethyl group or a phenyl group, and alkenyl siloxanes in which the vinyl groups in these alkenyl siloxanes have been substituted with, for example, an allyl group or a hexenyl group. Because the stability of platinum-alkenylsiloxane complexes is good, 1,3-divinyl-1,1,3,3-tetramethyldisiloxane is especially preferred.

The amount of component (E) is an amount sufficient to crosslink the composition. More specifically, an amount is preferred in which the catalyst metal in component (E) in terms of the total amount of components (A) and (B) is within a range from 0.01 to 500 ppm by mass or within a range from 0.1 to 100 ppm by mass.

Component (F) is a curing retarder for adjusting the curing rate and pot life of the composition. Examples of component (F) include alkyne alcohols such as 3-methyl-1-butyn-3-ol, 3,5-dimethyl-1-hexn-3-ol, 3-phenyl-1-butyn-3-ol, and 1-ethynyl-1-cyclohexanol; enyne compounds such as 3-methyl-3-penten-1-yne and 3,5-dimethyl-3-hexene-1-yne; alkenyl group-containing cyclic siloxanes such as tetramethyl tetravinyl cyclotetrasiloxane and tetramethyl tetrahexenyl cyclotetrasiloxane; and alkyne-containing silanes such as methyl-tris (3-methyl-1-butyne-3-oxy) silane and vinyl-tris (3-methyl-1-butyne-3-oxy) silane.

The amount of component (F) depends on the intended use and the molding method for the composition, but is generally within a range from 0.001 to 5 parts by mass per 100 parts by mass component (A).

The composition may also contain fine silica powder (G) to improve the strength of the resulting silicone rubber sponge. Examples of component (G) include fumed silica, precipitated silica; and fine silica powders surface-treated with, for example, a linear organopolysiloxane, cyclic organopolysiloxane, hexamethyldisilazane, or other type of organosilane. There are no particular restrictions on the BET specific surface area of component (G), but it is preferably in a range from 50 to 350 $m^2/g$ or in a range from 80 to 250 $m^2/g$.

The amount of component (G) per 100 parts by mass component (A) is at most 20 parts by mass, and preferably at most 15 parts by mass or at most 10 parts by mass. The amount of component (G) per 100 parts by mass component (A) is preferably at least 0.1 parts by mass.

The composition may also include reinforcing fillers such as fumed titanium oxide; non-reinforcing fillers such as ground quartz, crystalline silica, diatomaceous earth, asbestos, aluminosilicates, iron oxide, zinc oxide, and calcium carbonate; any of these fillers surface-treated with an organosilicon compound such as an organosilane or organopolysiloxane; pigments such as carbon black and red iron oxide; and other additives such as heat resistant agents, flame retardants, internal mold release agents, and plasticizers in amounts that do not impair the object of the present invention.

The composition can be easily produced by blending each of the components described above with additives if necessary and then uniformly mixing the resulting composition using a well-known kneading method. Examples of mixers that can be used include a homo mixer, paddle mixer, homo disper, colloid mill, vacuum mixer and stirrer, and planetary mixer. There are no particular restrictions as long as component (C) and component (D) are dispersed sufficiently in component (A).

A silicon rubber composition containing components (A) to (F) or components (A) to (G) can be produced using the following methods. When component (G) is included, preferably, a silica master batch is prepared by blending a portion of component (A) with component (G) before the rest of component (A) and the other components are mixed in.

Other methods include: placing component (A), component (B), component (C), component (D), component (F) and, if necessary, component (G) in a mixer, stirring and mixing the contents for a predetermined time, and then blending in component (E) prior to use; placing component (A), component (C), component (D), component (E) and, if necessary, component (G) in a mixer, stirring and mixing the contents for a predetermined time, and then blending in component (B) and component (F) prior to use; and placing component (A), component (C), component (D), and, if necessary, component (G) in a mixer, stirring and mixing the contents for a predetermined time, and then blending in component (B), component (E) and component (F) prior to use.

From the standpoint of storage stability, the composition is stored as a three-part sponge-forming liquid silicone rubber composition consisting of composition (I) which comprises component (A), component (C), component (D), component (E) and, if necessary, component (G) but not component (B) and component (F); composition (II) which comprises component (A), component (C), component (D), component (F) and, if necessary, component (G) but not component (B) and component (E); composition (III) which comprises component (B) but not component (C), component (E) and component (F); or composition (I) which comprises component (A), component (C), component (D), component (E) and, if necessary, component (G) but not component (B) and component (F); composition (II) which comprises component (F) but not component (B), component (C) and component (E); and composition (III) which comprises component (B) but not component (C), component (E) and component (F). Compositions (I) to (III) are then preferably mixed together immediately before being used for molding. Alternatively, the composition is stored as a two-part sponge-forming liquid silicone rubber composition consisting of composition (I') which comprises component (A), component (C), component (D), component (E) and, if necessary, component (G) but not component (B) and component (F); and composition (II") which comprises component (B) and component (F) but not component (C) and component (E). Compositions (I') and (II") are then preferably mixed together immediately before being used for molding.

The composition can be produced using the method described above, but a sponge-forming liquid silicone rubber composition including the following steps is especially preferred. Here, a production method for a composition obtained by mixing together and mechanically emulsifying mixture A containing a portion of component (A), component (B) and component (F), mixture B containing the remaining portion of component (A) and component (E), and mixture C containing component (C) also includes any of the following steps:

[1] a step of mixing component (D) with mixture A

[2] a step of mixing a non-silicone emulsifier in component (D) with mixture A and a step of mixing a silicone emulsifier in component (D) with mixture C

[3] a step mixing component (D) with mixture C

[4] a step of mixing a portion of component (D) with mixture A and a step of mixing the remaining portion of component (D) with mixture C

[5] a step of mixing a silicone emulsifier in component (D) with mixture A and a step of mixing a non-silicone emulsifier in component (D) with mixture C.

These are more specifically the following production methods.

A production method comprising:
Step 1: a step of mixing together a portion of component (A), component (B), component (D), and component (F);
Step 2: a step of mixing component (E) with the remaining portion of component (A); and
Step 3: mixing component (C) with the mixture resulting from Step 1 and Step 2 and then performing mechanical emulsification.

A production method comprising:
Step 1: a step of mixing together a portion of component (A), component (B), a non-silicone emulsifier in component (D), and component (F);
Step 2: a step of mixing component (E) with the remaining portion of component (A);
Step 3: a step of mixing together component (C) and a silicone emulsifier in component (D); and
Step 4: mixing together the mixtures resulting from Step 1, Step 2 and Step 3 and then performing mechanical emulsification.

A production method comprising:
Step 1: a step of mixing together a portion of component (A), component (B), and component (F);
Step 2: a step of mixing together the remaining portion of component (A) and component (E);
Step 3: a step of mixing component (C) with component (D); and
Step 4: mixing together the mixtures resulting from Step 1, Step 2 and Step 3 and then performing mechanical emulsification.

A production method comprising:
Step 1: a step of mixing together a portion of component (A), component (B), a portion of component (D), and component (F);
Step 2: a step of mixing component (E) with the remaining portion of component (A);
Step 3: a step of mixing component (C) with the remaining portion of component (D); and
Step 4: mixing together the mixtures resulting from Step 1, Step 2 and Step 3 and then performing mechanical emulsification.

A production method comprising:
Step 1: a step of mixing a portion of component (A) and component (B) with a silicone emulsifier in component (D) and component (F);
Step 2: a step of mixing component (E) with the remaining portion of component (A);
Step 3: a step of mixing together component (C) and a non-silicone emulsifier in component (D); and
Step 4: mixing together the mixtures resulting from Step 1, Step 2 and Step 3 and then performing mechanical emulsification.

A desired water-in-oil emulsion may be designed by using a multistage emulsification process for component (C) forming the aqueous phase in which the remaining portion of component (C) is added after using a portion as initial phase change water.

A silicone sponge can be formed from the component using several methods. Specifically, a silicone rubber sponge with a uniformly fine open-cell structure can be obtained by pouring the composition into a mold cavity, producing a water-containing silicone rubber molded article under pressure while holding the temperature under 100° C., preferably between 50 to 90° C., and releasing the water-containing silicone rubber molded article from the mold and heating it to a temperature from 120 to 250° C. to remove water. A string-like silicone rubber sponge can also be produced by discharging the composition in the shape of a rod from a nozzle into hot water at, for example, 80 to 100° C., to be cured, and then drying the cured product with hot air. A silicone rubber sponge sheet can be formed by coating a releasable substrate such as resin film with the composition, heating and curing the composition at, for example, 50 to 120° C., and then drying the sheet with hot air to remove water. The silicone rubber sponge sheet can also be formed by heating the sheet to remove water while curing the sheet, and then removing the releasable substrate. A silicone rubber sponge coated fabric can be formed by coating a synthetic fiber fabric or glass fabric with the composition, curing the composition by heating at, for example, 50 to 120° C., and drying the fabric with hot air to remove water. The silicone rubber sponge fabric can also be formed by heating to remove water while curing the composition.

The thickness of the silicone rubber sheet can be selected as appropriate, but a thickness from 0.05 to 80 mm, and especially from 0.1 to 50 mm, is preferred from the standpoint of effective utilization of the elasticity of the silicone rubber. The thickness of a fluorine resin or fluorine rubber layer formed on top is preferably from 5 to 200 µm, and more preferably from 10 to 100 µm.

Because a silicone rubber sponge of the present invention is formed from a stable emulsion, the resulting silicone sponge has a low density of 0.45 g/cm$^3$ or less, 0.40 g/cm$^3$ or less, 0.35 g/cm$^3$ or less, 0.30 g/cm$^3$ or less, or 0.25 g/cm$^3$ or less, and low thermal deformation (thermal expansion) due to heating. From the standpoint of excellent deformation recovery, 90% or more of cells are preferably open cells. Whether or not the cells are open cells can be determined by immersing the sponge in water and reducing the pressure for a predetermined period of time to replace the air in the sponge cells with water.

EXAMPLES

The following is a more detailed description of the sponge-forming liquid silicone rubber composition and silicone rubber sponge of the present invention with reference to examples. In the examples, the viscosity is the value at 25° C.

<Density>
The density of the silicone rubber sponges was measured according to JIS K6268.

<Emulsion Stability>
The emulsion stability of the hydrosilylation reaction-curable sponge-forming silicone rubber compositions was evaluated visually using the following criteria immediately after emulsification or somewhat later. Note that an evaluation such as "Δ-∘" refers to an intermediate state between the two.
  x: No emulsification, phase separation observed.
  Δ: Uneven emulsification, partial phase separation observed.
  ∘: Uniform and complete emulsification, no phase separation observed.

<Presence of Pinholes>
The pinholes on the surface of silicone rubber sponge test pieces (sheets) molded to a thickness of 100 µm were evaluated in terms of number, size, and condition according to the following criteria. The color tone (shade) and the surface gloss of the sheets were also evaluated. Note that the appearance (color tone and surface gloss) of a sheet can be adjusted by changing the quantity and the composition of the pigment master batch that is used. The evaluation was conducted under curing conditions in which the temperature was raised from room temperature to 90° C. (RT to 90° C.) during sponge formation and in which the temperature had been raised to 90° C. (90° C.) before sponge formation.

The number of pinholes: The number of pinholes per unit area was evaluated visually and assigned one of the following five scores. A lower pinhole count means a flatter, more uniform surface.
Evaluation 1: The number of pinholes is very small.
Evaluation 2: The number of pinholes is small.
Evaluation 3: The number of pinholes is medium.
Evaluation 4: The number of pinholes is large.
Evaluation 5: The number of pinholes is very large.

The size of pinholes:
The diameter of the pinholes per unit area was evaluated visually and assigned one of the following five scores. A smaller pinhole diameter (hole diameter) means a less uneven, flatter surface.
Evaluation 1: The pinhole diameter is very small
Evaluation 2: The pinhole diameter is small
Evaluation 3: The pinhole diameter is medium
Evaluation 4: The pinhole diameter is large
Evaluation 5: The pinhole diameter is very large
Pinhole conditions: A silicone rubber sponge test piece (sheet) was held over a light source, and penetration or non-penetration of pinholes was determined based on the light passing through the pinholes.
Penetration: Light passes through the pinholes and the light source can be identified
Non-Penetration: Light does not pass through the pinholes and the light source cannot be identified
Color Tone (Shade) and Surface Gloss of the Sheets: Evaluated by visual inspection.
Color Tone (Shade): A substantially same amount of pigment master batch was used. A light color tone is registered as "light" and a dark color tone is registered as "dark" in Table 1. Surface Gloss: Same as above. The presence or absence of surface gloss is registered in Table 1.

Note that, in general, unevenness due to uniform cells is more likely to occur on the surface of a cured sheet from a uniform emulsified state. This results in less surface gloss and a lighter color tone due to light being scattered by the uneven surface.

Examples 1, 2, Comparative Example 1

The silica masterbatch described below, component (A), component (C), component (D) and other components were placed in a homomixer (from Tokushu Kika) at the compounding ratios shown in Table 1, and were uniformly mixed together at 25° C. Some of the resulting mixture was placed in storage and examined for storage stability. Component (B), component (E) and component (F) were then blended into the resulting mixture, which was degassed to prepare a sponge-forming liquid silicone rubber composition. In Table 1, [SiH/Vi] indicates the molar ratio of silicon atom-bonded hydrogen atoms in the component corresponding to component (B) relative to the total number of vinyl groups in the component corresponding to component (A) in the composition. Examples 1 and 2 differ with respect to the presence of a resinous organopolysiloxane in the composition.

The resulting sponge-forming liquid silicone rubber composition was crosslinked and cured at 90° C. for 10 minutes in a compression molding machine to prepare a silicone rubber test piece with a high water content. The test piece was then placed in an open system at 200° C. for 4 hours to remove water from the test piece and obtain a silicone rubber sponge test piece. The density was measured using this silicone rubber sponge test piece, and the results are shown in Table 1.

The silica master batch was prepared by placing 100 parts by mass of dimethylvinylsiloxy-terminated dimethylpolysiloxane having a viscosity of 40 Pa·s, 40 parts by mass of fumed silica having a BET specific surface area of 225 $m^2/g$, 7 parts by mass of hexamethyldisilazane, 2 parts by mass of water, and 0.2 parts by mass of dimethylhydroxysiloxy-terminated dimethyl siloxane/methyl vinyl siloxane copolymer having a viscosity of 20 mPa·s (vinyl group content=about 10.9 mass %) in a Ross mixer to uniformly mix the components together at room temperature, and then heating the resulting mixture for two hours under reduced pressure at 200° C.

The following components were used as component (AL-1).
Component (a-1): Dimethylvinylsiloxy group-terminated dimethylpolysiloxane having a viscosity of 9 Pa·s (vinyl group content=0.14% by mass).
Component (a-2): Dimethylvinylsiloxy-terminated dimethylsiloxane/methylvinylsiloxane copolymer having a viscosity of 3.5 Pa·s (vinyl group content=0.50 mass %).

The following component was used as component (AL-2).
Component (a-3): Dimethylvinylsiloxy-terminated dimethylsiloxane/methylvinylsiloxane copolymer having a viscosity of 350 mPa·s (vinyl group content=about 1.17% by mass).

The following mixture was used as component (A-R).
A resinous organopolysiloxane comprising a trimethylsiloxy unit (M), a vinyldimethylsiloxy unit (ViM), and a $SiO_{4/2}$ unit (Q) (flaky at room temperature, (M+$^{n}$M)/Q siloxane unit mass ratio of 0.74, vinyl group content=about 2.80 mass %) and a dimethylvinylsiloxy-terminated dimethylpolysiloxane having a viscosity of 60 mPa·s (vinyl group content=about 1.60% by mass) were mixed together at a mass ratio of 45:55.

Component (B) was a trimethylsiloxy group-terminated dimethylsiloxane/methylhydrogensiloxane copolymer having a viscosity of 63 mPa·s (silicon atom-bonded hydrogen atom content=about 0.70 mass %).

Component (C) was a mixture of water and smectite clay prepared by placing 1 part by mass of smectite clay (purified organic polymer composite bentonite from Hojun, pH: 6.5) and 99.0 parts by mass of deionized water in a homomixer and thoroughly mixing them together at room temperature.

The following components were used as component (D).
Component (d-1): A nonionic surfactant with an HLB of 4.3 (sorbitan fatty acid ester, Leodol SP-010V from Kao Corporation).
Component (d-2): A nonionic surfactant with an HLB of 1.8 (sorbitan fatty acid ester, Leodol SP-030V from Kao Corporation).
Component (d-3): A silicone surfactant with an HLB of 4.0 (PEG-10 dimethicone, viscosity 1000 mPa·s, side chain polyether-modified silicone ES-5612 from Toray Dow Corning).

Component (E) was a catalyst obtained by micronizing a 1,3-divinyltetramethyldisiloxane complex of platinum and 1,3-divinyltetramethyldisiloxane using a thermoplastic resin (platinum metal content=about 4000 ppm). This microparticulate hydrosilylation reaction catalyst can be prepared using a process such as the one disclosed in Reference Example 1 of JP H07-118535 A.

Component (F) was a mixture of 2 parts by mass of 1-ethynyl-1-cyclohexanol and 98 parts by mass of dimethylvinylsiloxy-terminated dimethylpolysiloxane having a viscosity of 10 Pa·s (vinyl group content=0.13% by mass).

The pigment master batch was a mixture of 40 parts by mass of red iron oxide (trade name: Bayferrox from Bayer) and 60 parts by mass of dimethylvinylsiloxy-terminated dimethylpolysiloxane having a viscosity of 10 Pa·s (vinyl group content=0.13% by mass).

TABLE 1

| Parts by Mass | | | Examples | | Comparative Examples |
|---|---|---|---|---|---|
| | | | Example 1 | Example 2 | Comparative Example 1 |
| Silica Master Batch | | | 31.7 | 31.7 | 34.9 |
| (AL-1) Component | (a-1) Component | | 57.6 | 57.6 | 67.6 |
| | (a-2) Component | | 22.0 | 22.0 | 23.5 |
| (AL-2) Component | (a-3) Component | | 44.8 | 44.8 | 47.9 |
| (A-R) Component | | | 10.0 | — | — |
| (B) Component | | | 12.9 | 12.9 | 15.7 |
| (C) Component | | | 370.0 | 351.5 | 378.0 |
| (D) Component | (d-1) Component | | 0.07 | 0.07 | 0.09 |
| | (d-2) Component | | 1.34 | 1.34 | 1.64 |
| | (d-3) Component | | 8.10 | 8.10 | — |
| (E) Component | | | 1.57 | 1.57 | 1.57 |
| (F) Component | | | 0.50 | 0.50 | 0.61 |
| Pigment Master Batch | | | 9.5 | 9.5 | 10.5 |
| SiH/Vi | | | 2.69 | 3.45 | 3.88 |
| Density (g/m³) | | | 0.36 | 0.37 | 0.40 |
| Initial Emulsion Stability | | | ○ | ○ | ○ |
| Emulsion Stability Over Time | | | ○ | △~○ | x |
| RT to 90° C. Pinholes | Number | | 1 | 2 | 2 |
| | Size | | 2 | 3 | 1 |
| | Condition | | Penetrating | Almost Penetrating | Almost Penetrating |
| | Color Tone | | Light | Light | Dark |
| | Gloss | | No | No | Yes |
| 90° C. Pinholes | Number | | 3 | 3 | 4 |
| | Size | | 2 | 3 | 1 |
| | Condition | | Penetrating | Almost Penetrating | Almost Penetrating |
| | Color Tone | | Light | Light | Dark |
| | Gloss | | No | No | Yes |

As shown in Table 1, the sponge-forming liquid silicone rubber composition in the examples have excellent emulsion stability over time, and pinholes in the resulting silicone rubber sponge test pieces (sheets) were suppressed during every type of heating process when a 100 μm sheet was evaluated. Meanwhile, because the comparative example lacked the preferred silicone surfactant in component (d-3), the emulsion stability over time was especially poor when there was a high water content.

Reference Examples 1-5

The amount of component (C) in Example 1, Example 2, and Comparative Example 1 was adjusted and water was removed after the crosslinking reaction. At this time, emulsification was performed at a water content in which the design formulation density g/cm³ (=roughly calculated from an amount corresponding to the solid content of the entire formulation minus component (C)) for a sponge predicted to have no volumetric shrinkage was in a range from 0.25 to 0.45. The initial emulsion stability under these conditions is shown in Table 2. Here, a design formulation density of 0.35 g/cm³ corresponds to Example 1, Example 2, and Comparative Example 1 described above, and the formulation for Comparative Example 1 is inferior to those of the examples in terms of stability over time as mentioned above.

TABLE 2

| | Initial Emulsion Stability * Amt. of Component (C) Increased in Each Formula | | |
|---|---|---|---|
| Designed Formula Density g/cm³ | Example 1 Base Formula | Example 2 Base Formula | Comp. Example 1 Base Formula |
| 0.25 | ○ | ○ | x |
| 0.30 | ○ | ○ | x |
| 0.35 (Base Formula) | ○ | ○ | ○ |
| 0.40 | ○ | ○ | ○ |
| 0.45 | ○ | ○ | ○ |

As shown in Table 2, the compositions based on Example 1 and Example 2 have a design formulation density of less than 0.35, that is, the emulsion stability is excellent despite being compositions with a high water content. While the composition based on Comparative Example 1 also has a design formulation density of less than 0.35, stable emulsification cannot be performed. As a result, formation of a silicone rubber sponge having a design formulation density of less than 0.35 g/cm³ is difficult to realize using the composition in the comparative example. It is clear that a stable emulsion composition with a high water content and a low specific gravity silicone rubber sponge can only be realized using the compositions in Example 1 and Example 2.

INDUSTRIAL APPLICABILITY

Because a sponge-forming liquid silicone rubber composition of the present invention can form a low density sponge with a uniformly fine open-cell structure, it can be used to form silicone rubber sponges for use under high temperature conditions as elastic materials for rolls and belts in image forming devices such as electrophotographic copiers, laser beam printers, on-demand printers, and fax machines; and as heat insulation materials, sound absorbing materials, cushions, washers, gaskets, and pads.

The invention claimed is:

1. A hydrosilylation reaction-curable sponge-forming liquid silicone rubber composition comprising:
   (A) 100 parts by mass of an alkenyl group-containing organopolysiloxane;
   (B) an organopolysiloxane having at least two silicon atom-bonded hydrogen atoms per molecule in an amount such that the number of moles of hydrogen atoms bonded to silicon atoms in component (B) is 0.4 to 20 per mole of alkenyl groups in component (A);
   (C) 250 to 850 parts by mass mixture of water and an inorganic thickener;
   (D) 0.1 to 15 parts by mass of an emulsifier;
   (E) a hydrosilylation catalyst in an amount sufficient to crosslink the composition; and
   (F) 0.001 to 5 parts by mass of a curing retarder;
   wherein component (A) is an organopolysiloxane mixture of components (A-L) and (A-R) at a mass ratio of 93:7 to 75:25:
   (A-L) a linear or branched organopolysiloxane having at least two alkenyl groups per molecule; and (A-R) a resin-like organopolysiloxane containing a SiO$_{4/2}$ unit and/or a RSiO$_{3/2}$ unit where R is a monovalent hydrocarbon group, alkoxy group, or hydroxyl group, and having at least two alkenyl groups per molecule; and wherein the content of component (C) is 70% by mass or more relative to the entire composition.

2. The hydrosilylation reaction-curable sponge-forming liquid silicone rubber composition according to claim 1, wherein the density of a silicone rubber sponge obtained by crosslinking the sponge-forming liquid silicone rubber composition and then removing water from the silicone rubber is 0.45 g/cm$^3$ or less.

3. The hydrosilylation reaction-curable sponge-forming liquid silicone rubber composition according to claim 1, wherein at least a portion of component (D) is a silicone surfactant having an HLB value of less than 6.

4. The hydrosilylation reaction-curable sponge-forming liquid silicone rubber composition according to claim 3, wherein component (D) is a silicone surfactant having an HLB value of less than 6 represented by the general formula:

$$R^A{}_aR^B{}_bQ_cL_dSiO_{(4-a-b-c-d)/2}$$

where $R^A$ is a monovalent organic group excluding $R^B$, L and Q, a hydrogen atom, or a hydroxyl group, $R^B$ is a substituted or unsubstituted linear or branched monovalent hydrocarbon group having from 9 to 60 carbon atoms or a linear or branched organosiloxane group bonded to a silicon atom via a divalent organic group, L is a silylalkyl group having a carbosiloxane dendrimer structure bonded to a silicon atom via a divalent organic group, and Q is a monovalent hydrophilic group, and where each of a, b, c and d is a number in the ranges $1.0 \leq a \leq 2.5$, $0 \leq b \leq 1.5$, $0.001 \leq c \leq 1.5$, and $0 \leq d \leq 1.5$, and where c is a number such that the HLB value of the entire molecule is less than 6.

5. The hydrosilylation reaction-curable sponge-forming liquid silicone rubber composition according to claim 3, wherein at least a portion of component (D) is a silicone surfactant having an HLB value of less than 6 represented by the following structural formula:

[Formula 1]

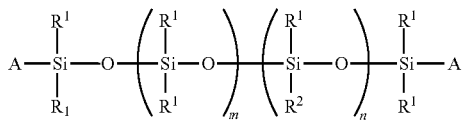

where $R^1$ is a monovalent hydrocarbon group, hydroxyl group or alkoxy group, $R^2$ is a group selected from a polyoxyalkylene group represented by —$R^3$—O—(C$_2$H$_4$O)$_d$(C$_3$H$_6$O)$_e$R$^4$ where $R^3$ is an alkylene group having from 2 to 30 carbon atoms and $R^4$ is a hydrogen atom or an alkyl group having from 1 to 30 carbon atoms or an inorganic group represented by $R^5$—(CO)— where $R^5$ is an alkyl group having from 1 to 30 carbon atoms, and each of d and e is an integer in the ranges of $0 \leq c \leq 50$ and $0 \leq d \leq 50$, respectively, provided $1 \leq d+e$, and each A is independently a group selected from $R^1$ and $R^2$, m is a number in a range from 1 to 500, and n is a number in a range from 0 to 100, provided at least one A is $R^2$ when n is 0.

6. The hydrosilylation reaction-curable sponge-forming liquid silicone rubber composition according to claim 5, wherein component (D) is a silicone surfactant having an HLB value in a range from 3 to 5 represented by Formula 1, where $R^1$ is a group selected from an alkyl group or halogenated alkyl group having from 1 to 6 carbon atoms, a phenyl group and a hydroxyl group, A is $R^1$, m is a number in the range from 5 to 100, and n is a number in the range from 1 to 5.

7. The hydrosilylation reaction-curable sponge-forming liquid silicone rubber composition according to claim 3, wherein component (D) comprises:
(D-1) a non-silicone nonionic surfactant having an HLB value of 3 or more;
(D-2) a non-silicone nonionic surfactant having an HLB value of less than 3 provided the mass ratio of component (D-1) to component (D-2) is at least 1; and
(D-3) a silicone surfactant having an HLB value of less than 6.

8. The hydrosilylation reaction-curable sponge-forming liquid silicone rubber composition according to claim 1, wherein component (E) is obtained by dispersing or encapsulating and then micronizing a hydrosilylation reaction catalyst in a thermoplastic resin.

9. The hydrosilylation reaction-curable sponge-forming liquid silicone rubber composition according to claim 1, wherein component (A-L) is an organopolysiloxane comprising from 10 to 90 mass % of (A-1) a diorganopolysiloxane having an average of two alkenyl groups at the molecular chain end and no alkenyl groups in a molecular side chain and from 10 to 90 mass % of (A-2) a diorganopolysiloxane having at least two alkenyl groups in a molecular side chain.

10. The hydrosilylation reaction-curable sponge-forming liquid silicone rubber composition according to claim 1, wherein the inorganic thickener in component (C) is smectite.

11. The hydrosilylation reaction-curable sponge-forming liquid silicone rubber composition according to claim 1, further comprising (G) at most 20 parts by mass silica fine powder per 100 parts by mass component (A).

12. A silicone rubber sponge obtained by crosslinking the sponge-forming liquid silicone rubber composition according to claim 1 and then removing water from the silicone rubber.

13. The silicone rubber sponge according to claim 12, wherein the average cell diameter is 1 μm or more and less than 50 μm, and the open cell ratio is 90% or more.

14. A method for producing the sponge-forming liquid silicone rubber composition according to claim 1, the method comprising:
1) mixing a portion of component (A) with component (B), component (D) and component (F);
2) mixing the remaining portion of component (A) with component (E); and
3) mixing together the mixture obtained in step 1), the mixture obtained in step 2), and component (C), and then subjecting the resulting mixture to mechanical emulsification.

15. A method for producing the sponge-forming liquid silicone rubber composition according to claim 1, the method comprising:
1) mixing a portion of component (A) and component (B) with a non-silicone emulsifier in component (D) and component (F);
2) mixing the remaining portion of component (A) with component (E);
3) mixing component (C) and a silicone emulsifier in component (D); and 4) mixing together the mixtures obtained in step 1), step 2), and step 3), and then subjecting the resulting mixture to mechanical emulsification.

16. A method for producing the sponge-forming liquid silicone rubber composition according to claim 1, the method comprising:
   1) mixing a portion of component (A) with component (B) and component (F);
   2) mixing the remaining portion of component (A) with component (E);
   3) mixing component (C) with component (D); and
   4) mixing together the mixtures obtained in step 1), step 2), and step 3), and then subjecting the resulting mixture to mechanical emulsification.

17. A method for producing the sponge-forming liquid silicone rubber composition according to claim 1, the method comprising:
   1) mixing a portion of component (A) and component (B) with a portion of component (D) and component (F);
   2) mixing the remaining portion of component (A) with component (E);
   3) mixing component (C) with the remaining portion of component (D); and
   4) mixing together the mixtures obtained in step 1), step 2), and step 3), and then subjecting the resulting mixture to mechanical emulsification.

18. A method for producing the sponge-forming liquid silicone rubber composition according to claim 1, the method comprising:
   1) mixing a portion of component (A), component (B) with a silicone emulsifier in component (D) and component (F);
   2) mixing the remaining portion of component (A) with component (E);
   3) mixing component (C) with a non-silicone emulsifier in component (D); and
   4) mixing together the mixtures obtained in step 1), step 2), and step 3), and then subjecting the resulting mixture to mechanical emulsification.

* * * * *